United States Patent

Koyanagi et al.

[15] 3,669,946

[45] June 13, 1972

[54] METHOD FOR PREPARING POLYVINYL CHLORIDE BY SUSPENSION POLYMERIZATION

[72] Inventors: Shunichi Koyanagi; Shigenobu Tajima, both of Naoetsu; Toshihide Shimizu, Okata-Machi, Nakakubiki-gun; Kazuhiko Kurimoto, Nakakubiki-gun, all of Japan

[73] Assignee: Shinetsu Chemical Company

[22] Filed: Aug. 31, 1970

[21] Appl. No.: 68,585

[52] U.S. Cl..................260/87.5 R, 260/78.5 CL, 260/86.3, 260/87.1, 260/87.5 C, 260/87.5 G, 260/87.7, 260/92.8 W
[51] Int. Cl.......................C08f 3/30, C08f 1/11, C08f 1/88
[58] Field of Search...................................260/92.8 W, 95 R

[56] References Cited

UNITED STATES PATENTS 3,515,709   6/1970   Nelson et al. ....................260/92.8 W Primary Examiner—Joseph L. Schofer
Assistant Examiner—John A. Donahue, Jr.
Attorney—Harry C. Bierman, Jordan B. Bierman and Bierman and Bierman

[57] ABSTRACT

Vinyl chloride or a mixture of vinyl monomers containing vinyl chloride in the ratio of at least 50 percent of the mixture is subjected in a polymerization vessel to suspension polymerization in an aqueous medium containing a suspending agent and an oil-soluble catalyst. The inner walls as well as the stirring blades and/or the condenser with which the vessel is equipped, are coated with a polar organic compound, dye, and/or pigment. The amount of polymer scale deposited on the inner walls of the vessel is reduced.

17 Claims, No Drawings

3,669,946

METHOD FOR PREPARING POLYVINYL CHLORIDE BY SUSPENSION POLYMERIZATION

This invention relates to an improved method for suspension polymerization, in an aqueous medium containing a suspending agent and an oil-soluble catalyst, of vinyl chloride or a mixture of vinyl monomers containing vinyl chloride in the ratio of at least 50 percent of the mixture.

The suspension polymerization of vinyl chloride is usually conducted in an aqueous medium, containing (i) a suspending agent exemplified by synthetic or natural polymers having protective colloidal properties, such as partially saponified polyvinyl acetate, cellulose ether and gelatin, and a solid dispersing agent such as calcium carbonate, magnesium carbonate, barium sulfate, titanium white and alumina, and (ii) a catalyst exemplified by organic peroxides such as lauroyl peroxide, benzoyl peroxide, isopropyl peroxydicarbonate, and acetyl cyclohexylsulfonyl peroxide, and azo compounds such as azobisisobutylonitrile and dimethylvaleronitrile. In conducting the polymerization, the aqueous medium containing the materials and the additives given above is placed in a polymerization pressure vessel equipped with a stirrer and a cooling jacket. While the inside temperature is kept at 30°–60° C, the aqueous medium is vehemently stirred. In this case, as is well known, polymer scales deposit on the inner walls of the vessel. This reduces the polymer yield and the cooling capacity of the polymerization vessel. It also permits the scales coming off the vessel walls to mix with the product. This deteriorates the physical properties of the product. It also reduces the speed of operation of the polymerization vessel since considerable labor and time must be expended in the removal of the scales. Still worse, the scale deposit on the vessel walls is one of the main factors serving to prevent continuous polymerization. A number of methods have hitherto been proposed to overcome the difficulties but no satisfactory results have been obtained as yet. Each method has its own advantages and disadvantages.

When vinyl chloride polymer is to be mass produced, the capacity of the polymerization vessel has to be increased. But in such case the wall areas are not increased sufficiently in proportion to the increase of the volume capacity of the vessel. Therefore, the heat conductive areas of the cooling jacket are often too small to accomplish their purpose. It is therefore proposed by one prior art method to equip the polymerization vessel with a condenser to promote cooling and stirring of the reaction system. However, in the course of the operation, polymer scales often are deposited on the inside walls of the conduit pipe connecting the portion of the polymerization vessel in contact with the gaseous phase and the condenser and on the portion where the condenser comes in contact with the monomer. This virtually prevents the condenser from operating. Moreover, it results in the deterioration in quality of the polymer prepared, and endangers the polymerization. Therefore this method has been found to be unsuitable in the suspension polymerization of vinyl chloride.

An object of the present invention is to provide a method for suspension-polymerizing vinyl chloride which is characterized, unlike previous methods, by there being hardly any deposit of polymer scale on the inner walls of the polymerization vessel. Another object of the invention is to increase the rate of polymerization so that polyvinyl chloride may be mass produced. Still another object of the invention is to provide a scale-free method for polymerizing vinyl chloride, without injuring the processability, particle distribution, and initial color and heat-stability of the product.

The present invention is based on our observations that in subjecting vinyl chloride monomer or a mixture of vinyl monomers containing vinyl chloride monomer as its main component to suspension polymerization in an aqueous medium containing a suspending agent and an oil-soluble catalyst, the above given objects will be attained, if the inner walls of the polymerization vessel and the stirring blades and/or the condenser, with which the vessel is equipped, have been coated with at least one compound selected from the group consisting of polar organic compounds composed of nitrogen atom-containing organic compounds such as those containing azo radicals, nitro radicals, nitroso radicals, azomethine radicals and azine cyclic and amine compounds; sulfur atom-containing organic compounds such as those containing thio-carbonyl radicals, thioether radicals, and thioalcohol radicals; quinone compounds; ketone compounds; aldehyde compounds; alcohol compounds having at least six carbon atoms; and carboxylic acid compounds having at least six carbon atoms; organic dyes such as azine dyes composed of azine, oxazine and thiazine, having oxygen, sulfur or nitrogen atoms, quinone dyes, azo dyes, phthalocyanine dyes, and aniline black; and inorganic pigments such as chrome yellow and zinc white.

When vinyl chloride is suspension-polymerized, polymer scales are usually deposited on the inner walls of the polymerization vessel. This is due to the adsorption by the inner walls of the polymerization vessel of the monomer which is subsequently polymerized. The attachment of the monomer to the inner walls of the polymerization vessel seems to be due to the uneveness of the surface of the walls or to the activation of the walls, which is brought about by the corrosion of the wall surface by halogen ions generated in the course of the polymerization. According to what has been observed in our studies, the attachment of the polymer scales can be prevented if the above-mentioned organic or inorganic substance(s) has been applied to the area where such scales are apt to be deposited. A very small amount of the coating material will serve the purpose. Moreover it will not deteriorate the physical properties of the vinyl chloride polymer prepared. Thus a method for polymerizing vinyl chloride very profitably, and even continuously is provided. In practicing the method of the present invention, it is not necessary to employ a large amount of suspending agent(s), as is usually the case, so as to prevent the attachment of the scales. As a result the product obtained will be endowed with various favorable properties.

When the polymerization is conducted in a polymerization vessel which is equipped with a condenser, the portion of the condenser where polymer scales are liable to be deposited should be treated beforehand as described above. Blocking up of the condenser will thereby be prevented. This increases the effectiveness of the condenser whose operation induces the unreacted vinyl chloride monomer to evaporate directly, depriving the polyvinyl chloride particles of the latent heat of evaporation, and preventing the heat from being stored up within the polymer particles. Consequently, the polymer obtained will have a uniform and adequate degree of polymerization.

According to the method of the invention, the substance(s) mentioned above is very thinly applied. It can be applied as is, dissolved in some solvent or diluted with a diluent. It is applied to the surface of the inner walls of the vessel, the stirring blades, and the baffles, where polymer scales are liable to be deposited. If the condenser is installed in a part of the polymerization vessel that is in contact with the gaseous phase or if it is installed outside the vessel and connected to the polymerization vessel, the condenser as well as the conduit pipe connecting the condenser and the polymerization vessel had best be similarly treated. It is not necessary to apply the substance too thickly. What is recommended is that it be applied in a thickness of at least 0.001 g/m². If the thickness of the coating is less than 0.001 g/m², the effect of the treatment will not last long; viz., if the polymerization vessel has been in operation for a long period of time, the prevention of the deposit of polymer scales cannot be expected to take place. But there is no upper limit to the thickness of the coating, so long as it has no adverse effect on the properties of the polyvinyl chloride prepared. Therefore, it may be made, for instance, 1 g/m² or more.

When vinyl chloride is to be polymerized in accordance with the method of the invention, it is advisable to add to the mother liquid a small amount of the organic substance(s) just mentioned or of alkali substance(s) and/or a certain kind of inorganic oxide. In other words, when the polymerization is to be conducted in a polymerization vessel coated with the substance(s) given above, a small amount, e.g., from several ppm to 100 ppm, of the substance(s) with which the vessel has been coated, had best be added to the mother liquid. It will help prevent the substance(s) coating the vessel from being dissolved in the aqueous phase or oil phase present in the polymerization vessel. Moreover, the additive(s) will gather over the surface of the suspended particles, further preventing the deposit of the polymer scales.

If some hydroxide or oxide of an alkali metal or alkaline earth metal is added to the liquid, either before or during the polymerization reaction, in an amount such that the pH of the liquid will be at least 6, or more preferably at least 8, at the completion of the polymerization, the prevention of polymer scale deposition will be further effected. However, if a partially saponified polyvinyl acetate is employed as a suspending agent in the polymerization, the use of an alkali will further saponify the polyvinyl acetate. This will have an adverse effect on the particle distribution of the polyvinyl chloride prepared. Therefore the addition of such an alkali should be made at a time when the polymerization rate of the vinyl chloride has become at least several percent. When the walls of the polymerization vessel are made of metal, the addition of some inorganic oxide to the mother liquid will be effective. If as such an oxide, potassium bichromate or potassium permangate is added to the aqueous medium before the polymerization takes place, the prevention by the above-given oxides of the deposit of polymer scales on the walls and other parts of the polymerization vessel will be further promoted. An amount of from several ppm to several times ten ppm of an oxide added to the liquid will be effective. If the amount is beyond this range, it will have an adverse effect on the particle distribution and on the quality of the polyvinyl chloride prepared.

The substance(s) to be applied to the surface of the walls of the polymerization vessel and to the stirrer and/or the condenser are exemplified by the following.

The polar organic compounds mentioned before as being used in the practice of the method of the invention are those which have one or more kinds of atoms or groups of atoms having unpaired electrons, such as oxygen atoms, nitrogen atoms or sulfur atoms. They consist of nitrogen atom-containing organic compounds selected from the group composed of those containing azo radicals, nitro radicals, nitroso radicals, azomethine radicals and azine cyclic and amine compounds:— azo methane, azo benzene, nitro benzene, nitroso benzene, monoamino mononitro azo benzene, pyrazine, pyridine, thiazine, oxazine, (morpholine, etc.), aniline, benzalaniline, EDTA, α-naphthylamine, ethanolamine, diethanolamine, methylene blue, nigrosine black, oil black, spirit black, glue; sulfur atom-containing organic compounds selected from the group consisting of those containing thiocarbonyl radicals, thioether radicals, thioalcohol radicals:— thioglycolic acid, thiourea, thiocarbanil acid, thiocarbamic acid, thiobenzoic acid, various thioethers and mercaptans represented by the formula R—S—R' (wherein R and R' are the same or different alkyl radicals); quinone compounds such as parabenzoquinone; aldehyde compounds such as formaldehyde, acetaldehyde and benzaldehyde; ketone compounds such as acetone; alcohols having at least six carbon atoms such as cetyl alcohol and octyl alcohol; and carboxylic acids having at least six carbon atoms such as stearic acid. If the alcohols or carboxylic acids have as few as from one to five carbon atoms, no satisfactory result will be obtained. Anionic and non-ionic surface active agents are also polar organic compounds of a special type, and they are effective in reducing the deposition of polymer scales, but there is some limit to the length of their alkyl radicals. It is generally considered that the limit of said length is up to $C_{18}$ or so. Such polar organic compounds should be intrinsically inactive in the polymerization reaction. The dyes which can be employed in the practice of the present invention are azo dyes such as water monoazo and polyazo dyes, metal-containing azo dyes, naphthol dyes (azoic dyes and inactive azoic dyes), and dispersable azo dyes; anthraquinone dyes such as anthraquinone acid dyes, anthraquinone vat dyes, anthrone vat dyes, alizarin dyes, dispersable anthraquinone dyes; indigoid dyes such as Brilliant Indigo B, indanthrene red violet RH, and indanthrene printing black B; sulfur dyes such as sulfur blue F.B.B. and sulfur black B; phthalocyanine pigments such as copper phthalocyanine and metal-free phthalocyanine compounds; diphenylmethane and triphenylmethane dyes; nitro dyes, nitron dyes, thiazole dyes; xanthene dyes; acridine dyes; azine dyes; oxazine dyes; thiazine dyes; benzoquinone dyes and naphthoquinone dyes; and cyanine dyes. Inorganic pigments which may also be used are chrome yellow, zinc yellow, ZTO-type zinc chromate, minium, iron oxide powder, and zinc white.

In order to fix these dyes or pigments onto the surface of the vessel walls, various fixing agents may be added to them. Such fixing agents are exemplified by natural and synthetic polymers such as glue, gelatin, cellulose derivatives, polyvinyl alcohol and polyacrylic acid, polystyrene, and polyvinyl chloride; thermosetting substances such as shellac resins, phenol resins, alkyd resins, epoxy resins, urethane resins, and tung oil; alcohols such as methanol, isopropyl alcohol and ethyl alcohol; organic acids such as acetic acid, p-toluene-sulfonic acid and rosin; ketones such as acetone; aromatic hydrocarbons such as toluene, benzene, and xylene; esters such as ethyl acetate, butyl acetate and dioctyl phthalate; and water. Any one or more kinds of them may be employed as additives.

The method of the invention is applicable to the suspension polymerization of vinyl chloride, and any known suspending agent may be employed in it. Such suspending agents are exemplified by polyvinyl alcohol, polyvinyl acetate, vinyl acetate-maleic anhydride copolymer, styrene-maleic anhydride copolymer, polyacrylic acid, gelatin, starch, and cellulose derivatives such as methyl cellulose, hydroxymethyl cellulose and carboxy methyl-cellulose.

The polymerization catalyst employed is selected from the group consisting of peroxides such as oil-soluble hydroperoxide, acyl peroxide, benzoyl peroxide, and lauroyl peroxide; and radical-generating catalysts such as azobisisobutylonitrile which generate azonitrile radicals, and in this case the reaction is conducted under ordinary agitation at a temperature between 20°C and 70° C.

The method of the present invention can be employed not only in the polymerization of vinyl chloride monomers but also in the copolymerization thereof. Vinyl monomers copolymerizable with vinyl chloride, include vinyl ester, vinyl ether, acrylic acid and methacrylic acid and esters thereof; maleic acid and fumaric acid and anhydrides and esters thereof; aromatic vinyl compound monomer, vinylidene halide, and olefin.

The method of the present invention will be further described in several examples, which, should not be construed as limiting the scope of the invention.

Example 1.

The inner surface of a stainless steel polymerization vessel, having an inside capacity of 1,000 liters, and the outer surface of a paddle-type stirrer (600 mm ) with which the polymerization vessel was equipped, were uniformly coated with the various compounds given in Table 1 at the rate of 0.005g/m². The compounds were coated either as is or dissolved in a small amount of benzene or ethanol. The coated surfaces were then dried. Subsequently, 200 kg of vinyl chloride monomer, 500 kg of pure water, 200 g of methyl-cellulose, and 200 g of lauroyl peroxide were charged into the polymerization vessel. While the stirrer was operated at a velocity of 100 rpm, the inside temperature was raised to 57° C. The vinyl chloride was polymerized at said temperature for 16 hours. The amounts of scale deposited on the portion of the polymerization vessel in contact with the liquid phase in the reaction vessel are given in Table 1, said amounts were much lower than amounts deposited when the polymerization vessel and the stirrer were uncoated.

A multi-pipe condenser (1m²), to which was also applied the compounds given above, was installed in the portion of the polymerization vessel in contact with the gaseous phase contained therein. The amount of scale attached to the condenser was also found to be greatly reduced. Further no blocking-up of the condenser took place.

TABLE 1

| Exp. No. | Compound applied to the walls of the polymerization vessel & other | Amount of scale deposited | | |
|---|---|---|---|---|
| | | On the parts in contact with the liquid phase (g) | On the parts in contact with the gaseous phase (g) | total amt. of scale (g) |
| 1 | Aniline | 1.5 | 0.5 | 2.0 |
| 2 | Formaldehyde | 3 | 2 | 5 |
| 3 | Thioglycolic acid | 1.1 | 0.4 | 1.5 |
| 4 | Azobenzene | 2.5 | 0.5 | 3.0 |
| 5 | Nitro benzene | 7 | 3 | 10 |
| 6 | Nitroso benzene | 5 | 3 | 8 |
| 7 | Pyrazine | 2.5 | 0.5 | 3 |
| 8 | Pyridine | 3 | 1 | 4 |
| 9 | Thiazine | 2.5 | 0.5 | 3 |
| 10 | Morpholine | 2.5 | 0.5 | 3 |
| 11 | Benzal aniline | 3.5 | 1.5 | 5 |
| 12 | Methylthioether | 5 | 2 | 7 |
| 13 | Thiourea C | 5 | 1 | 6 |
| 14 | Methylene blue | 0.7 | 0.3 | 1 |
| 15 | Alizarin yellow | 1.3 | 0.2 | 1.5 |
| 16 | Fast light yellow-G | 0 | 0 | 0 |
| 17 | Nigrosine black | 0 | 0 | 0 |
| 18 | Oil black | 0 | 0 | 0 |
| 19 | Spirit black | 0 | 0 | 0 |
| 20 | Indanthrene golden yellow-RX | 0 | 0 | 0 |
| 21 | Alizarin red V2A | 0 | 0 | 0 |
| 22 | Indanthrene grey-X | 0 | 0 | 0 |
| 23 | Oil blue-G extra | 0 | 0 | 0 |
| 24 | Parabenzoquinone | 5 | 1 | 6 |
| 25 | Glue | 2 | 1 | 3 |
| 26 | Monoamino nitrosobenzene | 0.3 | 0.2 | 0.5 |
| 27 | Cetyl alcohol | 5 | 5 | 10 |
| 28 | Stearic acid | 7 | 8 | 15 |
| 29 | Octyl alcohol | 10 | 3 | 13 |
| 30 | Acetone | 8 | 2 | 10 |
| 31 | Aniline black | 0 | 0 | 0 |
| 32 | None | 500 | 200 | 700 |

EXAMPLE 2.

Experiments were conducted just as in Example 1 in which the compounds applied to the inner walls of the polymerization vessel and the stirrer were selected from the group consisting of EDTA, α-naphthylamine, thiourea, phthalocyanine blue, and fast oil yellow-G, in the amounts given in Table 2. When vinyl chloride was subjected to suspension polymerization in this polymerization vessel, the amount of scale deposited and the properties of the vinyl chloride polymer prepared were as given in Table 2.

TABLE 2

| Exp. No. | Compound applied | | None | 0.001 g/m² | 0.005 g/m² | 1 g/m² |
|---|---|---|---|---|---|---|
| 33 | EDTA | Amount of scale | 700 | 100 | 1 | 1 |
| | | Particle distribution (0100 poss)(%) | 50.5 | 50.7 | 49.3 | 49.9 |
| | | Heat stability | OK | OK | OK | OK |
| | | Initial color | OK | OK | OK | OK |
| | | Foreign matter (piece) | 15 | 13 | 17 | 20 |
| 34 | naphthylamine | Amount of scale (g) | 700 | 90 | 0.7 | 0.6 |
| | | Particle distribution (0100 pass)(%) | 50.5 | 51.0 | 49.2 | 47.1 |
| | | Heat stability | OK | OK | OK | Rather poor |
| | | Initial color | OK | OK | OK | Rather poor |
| | | Foreign matter (piece) | 15 | 18 | 16 | 12 |
| 35 | Thiourea | Amount of scale (g) | 700 | 130 | 3 | 2.5 |
| | | Particle distribution (0100 pass)(%) | 50.5 | 51.0 | 50.1 | 47.9 |
| | | Heat stability | OK | OK | OK | Rather poor |
| | | Initial color | OK | OK | OK | Rather poor |
| | | Foreign matter (piece) | 15 | 14 | 17 | 19 |
| 36 | Phthalocyanine blue | Amount of scale (g) | 700 | 70 | 1 | 1.2 |
| | | Particle distribution (0100 pass)(%) | 50.5 | 49.2 | 49.7 | 51.0 |
| | | Heat stability | OK | OK | OK | Rather poor |
| | | Initial color | OK | OK | OK | Poor |
| | | Foreign matter piece | 15 | 20 | 18 | 30 |
| 37 | Fast oil yellow-G | Amount of scale (g) | 700 | 70 | 1.5 | 0.8 |
| | | Particle distribution (0100 pass) (%) | 50.5 | 49.7 | 49.5 | 50.0 |
| | | Heat stability | OK | OK | OK | Rather poor |
| | | Initial color | OK | OK | OK | Rather poor |
| | | Foreign matter (piece) | 15 | 19 | 13 | 18 |

EXAMPLE 3.

The inner surface of a stainless steel polymerization vessel having an inside capacity of 1,000 liters, and the outer surface of a paddle-type stirrer (600 mmφ) and one baffle, with which the polymerization vessel was equipped, were coated with the compounds given in Table 3 at the rate of 0.005 g/m², and then were dried. Then, 200 kg of vinyl chloride monomer, 500 kg of pure water, 200 g of methylcellulose, and 60 g of dimethylvaleronitrile, together with 10 ppm of the same compound as had been applied to the vessel walls and other surfaces were charged into the polymerization vessel. While the stirrer was operated at a velocity of 100 rpm, the polymerization was conducted for 16 hours at 57° C. At the end of the period (1 batch), the polymer was removed and the polymerization was resumed, with 16 hours as a period for a batch, until the inner walls of the polymerization vessel became frosted in appearance to the naked eye, thereby foretelling the deposit of scale in the next period, or until the amount of scale exceeded 1 g. The results obtained are given in Table 3.

TABLE 3

| Exp. No. | Compound applied | No. of continuous batches | | |
|---|---|---|---|---|
| | | Added | Applied | Applied and added |

| | | | |
|---|---|---|---|
| 38 Thioglycolic acid | 1 | 3 | 5 |
| 39 Aniline | 1 | 2 | 4 |
| 40 Alizarin yellow | | 1  4 | 6 |
| 41 Nigrosine black | 1 | 10 | 15 |
| 42 Oil black | 1 | 10 | 15 |
| 43 Spirit black | 1 | 10 | 15 |
| 44 Thiazine | 1 | 7 | 12 |
| 45 Chrome yellow | — | 2 | — |

EXAMPLE 4.

Experiments similar to those described in Example 3 were conducted. However, the compounds added to the reactants were different from those that were applied to the inner walls of the polymerization vessel and other surfaces. The number of continuous batches before scale was deposited and the physical properties of the polymer obtained are given in Table 4.

TABLE 4

| Exp. No. | Compound applied | Compound added | No. of continuous batches Applied | Applied and added |
|---|---|---|---|---|
| 46 | Thioglycolic acid | Nigrosine black | 3 | 6 |
| 47 | Aniline | Nigrosine black | 2 | 5 |
| 48 | Nigrosine black | Thiazine | 10 | 15 |
| 49 | Oil black | Spirit black | 10 | 15 |
| 50 | Spirit black | Aniline | 10 | 13 |
| 51 | Thiazine | Nigrosine black | 7 | 12 |
| 52 | None | None | — | — |

TABLE 4

| Exp. No. | Physical properties of polymers | | | |
|---|---|---|---|---|
| | Particle distribution 0100 pass (%) | Heat stability | Initial color | Foreign matter (piece) |
| 46 | 45–56 | OK | OK | 10–15 |
| 47 | 45–56 | OK | OK | 12–16 |
| 48 | 42–53 | OK | OK | 16–20 |
| 49 | 44–58 | OK | OK | 10–18 |
| 50 | 45–55 | OK | OK | 10–20 |
| 51 | 42–54 | OK | OK | 10–16 |
| 52 | 42–58 | OK | Rather poor | 10–20 |

EXAMPLE 5.

Experiments similar to Nos. 48 and 50 in Example 4 were conducted. However the additives were employed in amounts of 100 ppm and 1,000 ppm, respectively. The number of continuous batches before scale was deposited and the physical properties of the polymer obtained are given in Table 5.

TABLE 5

| Exp. No. | Compound applied | Compound added | Amount of compound | None | 100 ppm | 1000 ppm |
|---|---|---|---|---|---|---|
| 53 | Nigrosine Thiazone black | | No. of continuous batches before scale was deposited | 10 | 15 | 15 |
| | | | Particle distribution No. 100 pass (%) | 51.2 | 51.5 | 53.5 |
| | | | Heat stability | OK | OK | NG |
| | | | Initial color | OK | OK | NG |
| | | | Foreign matter (piece) | 20 | 20 | 25 |
| 54 | Aniline Nigrosine black | | No. of continuous batches before scale was deposited | 2 | 5 | 5 |
| | | | Particle distribution No. 100 pass (%) | 49.0 | 50.0 | 51.6 |
| | | | Heat stability | OK | OK | NG |
| | | | Initial color | OK | OK | NG |
| | | | Foreign matter (piece) | 15 | 18 | 20 |

EXAMPLE 6.

In a stainless steel polymerization vessel, having an inside capacity of 1,000 liters and equipped with a paddle-type stirrer (600mm$\phi$) and a baffle were charged 200 kg of vinyl chloride monomer, 500 kg of pure water, 200 g of methylcellulose, and 100 g of azobisisobutyronitrile, together with the compounds given in Table 6 and 0.01 percent of an alkali as heretofore mentioned. While the stirrer was operated at a velocity of 100 rpm, the polymerization was conducted at 57°C. Before the polymerization was started, the surface of the inner walls of the polymerization vessel and outer surface of the paddles and the baffle were uniformly coated, at the rate of 0.005 g/m$^{benzene}$, with the compounds given in Table 6. The compounds were coated either as is or dissolved in a small amount of benzene. The coated surfaces were then dried. The amount of scale deposited and the physical properties of the polymer obtained are given in Table 6.

TABLE 6

| Experiment Number | 55 | 56 | 57 | 58 | 59 | 60 | 61 | 62 |
|---|---|---|---|---|---|---|---|---|
| Condition: | | | | | | | | |
| ph controlling agent (alkali) | NaOH | | KOH | | NH$_4$OH | | Ca(OH)$_2$ | |
| Compound applied | Alizarine yellow | | Nigrosine black | | Nigrosine black | | Chrome yellow | |
| Compound added | None | | Nigrosine black | | Aniline | | Water-soluble nigrosine black | |
| Alkali added | None | Some | None | Some | None | Some | None | Some |
| Result: | | | | | | | | |
| Nos. of continuous batches | 3 | 7 | 15 | 25 | 15 | 25 | 7 | 12 |
| pH | 3 | 7–9 | 2–4 | 7–9 | 2–4 | 7–9 | 2–4 | 6–8 |
| Particle distribution, #100 pass (percent) | 46–55 | 50–55 | 42–55 | 51–55 | 47–55 | 50–55 | | |
| Heat stability | OK | OK | OK | OK | OK | OK | | |
| Initial color | OK | OK | OK | OK | OK | OK | | |
| Foreign matter (piece) | 18 | 10–20 | 10–18 | 10–21 | 10–20 | 14–25 | | |

EXAMPLE 7.

In a stainless steel polymerization vessel, having an inside capacity of 1,000 liters and equipped with a paddle-type stirrer (600 mm$\phi$) and a baffle, were charged 200 kg of vinyl chloride monomer, 500 kg of pure water, 200 g of partially saponified polyvinyl acetate, 30 g of isopropyl-peroxydicarbonate, together with 10 ppm of nigrosine black. The polymerization was conducted at 57° C, while the stirrer was operated at a velocity of 100 rpm. Before the polymerization was started, the surface of the inner walls of the polymerization vessel and the outer surface of the paddles and the baffle were uniformly coated at the rate of 0.005 g/m$^2$ with spirit black dissolved in a small amount of benzene. An aqueous solution of NaOH was employed as an alkali. The effect which the amount of alkali employed and the manner of its addition had on the reaction velocity, the amount of scale deposited, and the physical properties of the polymer obtained, are given in Table 7.

TABLE 7

| Experiment Number | 63 | 64 | 65 | 66 | 67 | 68 | 69 | 70 | 71 | 72 | 73 | 74 |
|---|---|---|---|---|---|---|---|---|---|---|---|---|
| Amount of alkali (NaOH) based on amount of VC (percent). | 0.01 | | 0.01 | | 0.01 | | 0.01 | | 0.001 | | 0.1 | |
| Time for addition of alkali | At the charge of water. | | 1 hr. after the start of the reaction. | | 1.5-4 hrs. after the start of the reaction. | | 3 hrs. after the start of the reaction. | | At the charge of water. | | At the charge of water. | |
| Nos. of batches before scales were deposited. | 25 | | 23 | | 22 | | 18 | | 18 | | 30 | |
| pH of the mother liquid at the completion of polymerization. | 7–9 | | 7–9 | | 7–9 | | 7–9 | | 5 | | 10–11 | |
| Particle distribution Mesh Pass (percent). | 60 | 100 | 60 | 100 | 60 | 100 | 60 | 100 | 60 | 100 | 60 | 100 |
| | 80.3 | 21.2 | 99.2 | 47.3 | 99.8 | 53.4 | 99.9 | 54.0 | 93.4 | 30.1 | 65.1 | 13.8 |
| Initial color | OK | | OK | | OK | | OK | | OK | | Rather poor | |
| Reaction time [1] (hr.) | $\eta=60\%$ (12) | | $\eta=70\%$ (9.5) | | $\eta=88\%$ (9) | | $\eta=90\%$ (9) | | $\eta=90\%$ (9.5) | | $\eta=50\%$ (20) | |

[1] Reaction time is time required for the conversion rate ($\eta$) to reach the values given above.

EXAMPLE 8.

In a stainless steel polymerization vessel, having an inside capacity of 1,000 liters and equipped with a paddle-type stirrer (600 mm$\phi$) and a baffle, were charged 200 kg of vinyl chloride monomer, 500 kg of pure water, 200 g of partially saponified polyvinyl acetate, and 100 g of azobisisobutyronitrile, together with 10 ppm of an additive and 1 ppm of an oxidizer as given in Table 8. Before the polymerization was started, the surface of the inner walls of the polymerization vessel and the outer surface of the paddles and the baffle were uniformly coated, at the rate of 0.005 g/m² with the compounds given in Table 8. The compounds were coated either as is or dissolved in a small amount of toluene or methanol. The coated surfaces were then dried. The polymerization was conducted at 57° C, while the paddles were operated at a velocity of 100 rpm. Two hours after the start of the polymerization, 0.01% of NaOH was added. The numbers of continuous batches before scale was deposited and the physical properties of the polymer obtained are given in Table 8.

EXAMPLE 9.

The same polymerization vessel that was employed in Example 1 was charged with liquid methylcellulose and vinyl chloride monomer, by means of a quantity controlling pump, in the amounts given below, and with the prescribed amount of the catalyst (azobisisobutyronitrile), by means of a minute-quantity controlling pump. The reaction liquid was permitted to be discharged by its own pressure through a control valve into the product storage tank. The polymerization was carried out for 60 hours. The amount of scale deposited on the walls of the polymerization vessel and other surfaces at the end of the polymerization is given in Table 9. Before the polymerization was started, the surface of the inner walls of the polymerization vessel was uniformly coated with oil black or nigrosine black at the rate of 0.005 g/m² and 10 ppm of oil black, and 1 ppm of $Na_2Kr_2O_7$, based on the amount of vinyl chloride were added to the polymerization system. About 0.01 %/Feed VC or so of NaOH was also added to the reactants to maintain the pH of the reaction liquid at from 7 TO 8. The

TABLE 8

| Exp. No. | 75 | 76 | 77 | 78 | 79 | 80 | 81 | 82 | 83 | 84 | 85 | 86 |
|---|---|---|---|---|---|---|---|---|---|---|---|---|
| Compound applied | Spirit black | | Nigrosine black | | Nigrosine black | | Phthalocyanine blue | | Phthalocyanine blue | | Phthalocyanine blue | |
| Compound added | None | | Methylene blue | | Nigrosine black | | None | | Phthalocyanine blue | | Aniline | |
| Further addition of NaOH | None | | Some | | Some | | Some | | None | | Some | |
| Oxidizer: | | | | | | | | | | | | |
| Potassium bichromate | None | Some | None | Some | None | Some | None | Some | None | Some | None | Some |
| Ceric sulfate | | | | | | | | | | | | |
| Number of continuous batches before scales was deposited | 10 | 15 | 23 | 30 | 25 | 35 | 10 | 17 | 7 | 12 | 14 | 19 |
| Properties: | | | | | | | | | | | | |
| #100 pass (percent) | 46 | 40–45 | 41–45 | 40–42 | 41–45 | 40–43 | 41–46 | 43–55 | 46–55 | 40–55 | 41–46 | 40–46 |
| Heat stability | OK | OK | OK | OK | OK | OK | OK | OK | OK | OK | OK | OK |
| Initial coloring | OK | OK | OK | OK | OK | OK | OK | OK | OK | OK | OK | OK |
| Foreign matter (piece) | 15 | 15–20 | 12–16 | 12–16 | 14–18 | 11–19 | 13–17 | 13–17 | 10–20 | 10–17 | 16–18 | 17–21 |

Note.—As partially saponified polyvinyl acetate was employed in the present experiments, NaOH was added in the course of the polymerization.

TABLE 8

| Exp. No. | 87 | 0 |
|---|---|---|
| Compound applied | Spirit black | Phthalocyanine blue |
| Further addition of NaOH | None | None |
| Oxidizer | None | None |
| Nos. of continuous batches before scale was deposited | — | — |
| Properties | | |
| No. 100 pass(%) | 45–56 | 48 |
| Heat stability | OK | OK |
| Initial color | OK | OK |
| Foreign matter (piece) | 18–25 | 22 | compounds whose presence would prevent the deposit of scale were added either dissolved or suspended in pure water.

Kinds and amounts of substances put in the polymerization vessel:

| a Pure water | 160 | kg/hr |
|---|---|---|
| b Methylcellulose | 80 | g/hr |
| c Oil black | 0.8 | g/hr (suspended in aqueous solution of toluene) |
| d $Na_2Kr_2O_7$ | 0.08 | gr/hr |
| e NaOH | 8 | g/hr |
| f Vinyl chloride monomer | 80 | kg/hr |
| g Azobisisobutyronitrile | 30 | g/hr |

Reaction condition:
Agitation : 600 mm paddles, 100 rpm
Reaction temperature : 57° C.

TABLE 9

| Exp. No. | 89 | 90 | 91 | 92 |
|---|---|---|---|---|
| Compound applied | Oil black | nigrosine black | None | nigrosine black |
| Time elapsed before scale was deposited (hr) | 60 | 60 | 15 | 60 |

| | | | | |
|---|---|---|---|---|
| Amount of scale deposited (g) Breakdown | 0 | 0 | 2000 | 0 |
| Amount of scale deposited on the part in contact with the gaseous phase | 0 | 0 | 1500 | 0 |
| Amount of scale deposited on the part in contact with the liquid phase | 0 | 0 | 500 | 0 |

In No. 92, a 0.5 m² condenser was connected to the polymerization vessel at the portion in contact with the gaseous phase of vinyl chloride. The condenser was operated at a reflux rate of 50 kg/hr of liquid vinyl chloride. In this case the amount of scale deposited on the vessel walls as well as on the condenser was virtually zero.

We claim:

1. In a method for the suspension-polymerization of vinyl chloride monomer or a mixture of vinyl monomers containing vinyl chloride, in an aqueous polymerization mixture containing a suspending agent and an oil-soluble catalyst, said polymerization being conducted in a polymerization vessel having a surface in contact with said monomer or mixture of monomers, the improvement which comprises the step of coating said surface, prior to the polymerization, with a coating compound selected from the group consisting of polar organic compounds, organic dyes, inorganic pigments, and mixtures thereof, said polar organic compounds being selected from the group consisting of nitrogen atom containing compounds, sulfur atom containing compounds, oxygen atom containing compounds, anionic surface active agents and nonionic surface active agents; said nitrogen atom containing compounds being selected from the group consisting of azo radical containing compounds, nitro radical containing compounds, nitroso radical containing compounds, azomethine radical containing compounds, azine cyclic compounds, and amines; said amines being selected from the group consisting of aniline, benzalaniline, EDTA, α-naphthylamine, ethanolamine, diethanolamine and glue to produce a coating on said surface of at least 0.001 g/m² whereby polymer scale deposition on said surface is reduced.

2. The method as claimed in claim 1 wherein said organic dyes are selected from the group consisting of azo dyes, anthraquinone dyes, indigoid dyes, sulfur dyes, phthalocyanine dyes, diphenylmethane dyes, triphenylmethane dyes, nitro dyes, thiazole dyes, nitron dyes, xanthrene dyes, acridine dyes, azine dyes, oxazine dyes, thiazine dyes, benzoquinone dyes, naphthoquinone dyes, and cyanine dyes; and said inorganic pigments are selected from the group consisting of chrome yellow, zinc yellow, ZTO type-zinc chromate, minium, iron oxide powder and zinc white.

3. The method as claimed in claim 6 wherein said sulfur atom containing compounds are selected from the group consisting of thiocarbonyl radical containing compounds, thioether radical containing compounds and thioalcohols; said oxygen atom containing compounds are selected from the group consisting of quinones, aldehydes, ketones, alcohols having at least six carbon atoms and carboxylic acids having at least six carbon atoms; said anionic and nonionic surface active agents have alkyl radicals containing less than about 18 carbon atoms; said azo dyes are selected from the group consisting of aqueous monoazo dyes, aqueous polyazo dyes, metal-containing azo dyes, naphthol dyes, dispersable azo dyes, fast light yellow G and fast oil yellow G; said anthraquinone dyes are selected from the group consisting of anthraquinone acid dyes, anthraquinone vat dyes, anthrone vat dyes, alizarine dyes, dispersable anthraquinone dyes, Indanthrene golden yellow RY, Indanthrene gray-X and oil blue-G extra; said indigoid dyes are selected from the group consisting of Brilliant Indigo B, Indanthrene red violet RH and Indanthrene printing black B; said sulfur dyes are selected from the group consisting of sulfur blue F.B.B. and sulfur black B; said phthalocyanine dyes are selected from the group consisting of copper phthalocyanine, metal-free phthalocyanine compounds and phthalocyanine blue; and said azine dyes are selected from the group consisting of aniline black, nigrosin black, oil black and spirit black.

4. The method as claimed in claim 3 wherein said alizarine dyes are alizarine yellow of alizarine red V2A.

5. The method as claimed in claim 3 wherein said azo radical containing compounds are selected from the group consisting of azomethane, azobenzene and monoamino nitroso benzene; said nitro radical containing compounds are nitrobenzene; said nitroso radical containing compounds are nitroso benzene or monoaminonitrosobenzene; said azine cyclic compounds are selected from the group consisting of pyrazine, pyridine, thiazine, oxazine, methylene blue, nigrosine black, oil black, and spirit black; said thiocarbonyl radical containing compounds are selected from the group consisting of thiglycolic acid, thiocarbamic acid, thiocarbanil acid, and thiobenzoic acid; said thioether radical containing compound is selected from the group consisting of thiourea and methyl thioether; said thio alcohols are mercaptans having the general formula R-S-R' wherein R and R' are alkyl radicals; said quinone compounds are parabenzoquinone; said aldehydes are selected from the group consisting of formaldehyde, acetaldehyde and benzaldehyde; said ketones are acetone; said alcohols are cetyl alcohol or octyl alcohol; and said carboxylic acids are stearic acid.

6. The method as claimed in claim 1 wherein vinyl chloride monomer is polymerized and at most 100 ppm of said coating compound is added to the polymerization mixture, the monomer, or to the polymerization mixture and the monomer.

7. The method as claimed in claim 1 wherein an alkali substance is added to the polymerization mixture in an amount such that the pH of the polymerization mixture at the termination of the polymerization will be at least 6.

8. The method as claim in claim 6 wherein an alkali substance is added to the polymerization mixture in an amount such that the pH of the polymerization mixture at the termination of the polymerization will be at least 6.

9. The method as claimed in claim 1 further including the step of adding to the polymerization mixture an additive selected from the group consisting of permanganate salts, bichromate salts and ceric sulfate.

10. The method as claimed in claim 6 further including the step of adding to the polymerization mixture an additive selected from the group consisting of permanganate salts, bichromate salts and ceric sulfate.

11. The method as claimed in claim 7 further including the step of adding to the polymerization mixture an additive selected from the group consisting of permanganate salts, bichromate salts and ceric sulfate.

12. The method as claimed in claim 8 further including the step of adding to the polymerization mixture an additive selected from the group consisting of permanganate salts, bichromate salts and ceric sulfate.

13. The method as claimed in claim 1 wherein said suspending agent is a protective colloidal material selected from the group consisting of polyvinyl acetate, partially saponified polyvinyl acetate, polyvinyl alcohol, vinylacetate-maleic anhydride copolymer, styrene-maleic anhydride copolymer, polyacrylic acid, starch, methyl cellulose, hydroxymethyl cellulose, carboxymethyl cellulose, cellulose ether and gelatin or a dispersing agent selected from the group consisting of calcium carbonate, magnesium carbonate, barium sulfate, titanium white and alumina.

14. The method as claimed in claim 1 wherein said catalyst is an organic peroxide or an azo compound.

15. The method as claimed in claim 14 wherein said organic peroxide is an oil-soluble hydroperoxide, lauroyl peroxide, benzoyl peroxide, isopropyl peroxydicarbonate or acetyl cyclohexyl sulfonyl peroxide and said azo compound is azobisisobutylonitrile or dimethylvaleronitrile.

16. The method as claimed in claim 1 wherein said polymerization is conducted at a temperature of 20°–70° C.

17. The method as claimed in claim 1 wherein said suspending agent is partially saponified polyvinyl acetate and said alkali substance is added when the polymerization rate is at least several percent.

* * * * *